United States Patent [19]

Rossi et al.

[11] B 4,007,049
[45] Feb. 8, 1977

[54] THERMAL SHOCK RESISTANT CERAMIC COMPOSITE

[75] Inventors: Ronald C. Rossi; Robert D. Carnahan, both of Torrance, Calif.

[73] Assignee: The United States of America as represented by the Secretary of the Air Force, Washington, D.C.

[22] Filed: Aug. 6, 1968

[21] Appl. No.: 750,679

[44] Published under the second Trial Voluntary Protest Program on March 23, 1976 as document No. B 750,679.

[52] U.S. Cl. .................................. 106/58; 106/55; 106/65; 106/73.2; 106/73.4; 252/301.1 R

[51] Int. Cl.² ...................................... C04B 35/04

[58] Field of Search .................... 252/301.1 R, 478; 106/39, 58, 65, 55, 73.2, 73.4

[56] References Cited

UNITED STATES PATENTS

| 3,137,657 | 6/1964 | Quirk et al. | 252/478 |
| 3,261,800 | 7/1966 | Collins | 252/478 X |
| 3,263,004 | 7/1966 | Bean | 252/301.1 X |
| 3,278,454 | 10/1966 | Turner et al. | 252/478 |
| 3,320,176 | 5/1967 | Davis | 252/301.1 |

OTHER PUBLICATIONS

Nuclear Science Abstracts; vol. 21, No. 6, Mar. 1967; Abstract No. 9244; p. 968.

*Primary Examiner*—Stephen J. Lechert, Jr.
*Attorney, Agent, or Firm*—Joseph E. Rusz; William J. O'Brien

[57] ABSTRACT

A ceramic material characterized by a high degree of resistance to failure by thermal fracture which comprises a composite of a refractory oxide and flaked boron nitride. The boron nitride flakes are incorporated into a refractory oxide matrix as an inert, nonreactive, uniform dispersed phase in proportions sufficient to provide the oxide composite with an increased resistance to thermal shock.

3 Claims, No Drawings

THERMAL SHOCK RESISTANT CERAMIC COMPOSITE

BACKGROUND OF THE INVENTION

This invention relates to ceramic compositions. More particularly, this invention concerns itself with thermal shock resistant refractory oxide composites such as may be utilized as structural materials in the fabrication of crucibles, furnace linings, missile and rocket components as well as other related structures which encounter high temperatures during their operation.

The development of ceramic materials characterized by an improved resistance to failure by thermal and mechanical fracture has become a problem of particular importance with the recent advances achieved in rocket technology and especially in the development of antenna windows for advanced reentry vehicles. A number of materials have been suggested during the many attempts to solve this problem. For example, various ceramic oxides and nitrides such as aluminum oxide, beryllium oxide, magnesium oxide and boron nitride are potential candidates for use as antenna window material in advanced reentry vehicles because of their combined refractoriness and high temperature dielectric property. However, the oxides are susceptible to failure by thermal fracture at ultra high temperatures while boron nitride is difficult and extremely expensive to fabricate into the large monolithic pieces needed for antenna window construction.

In attempting to provide these ceramic materials with increased resistance to fracture by thermal shock, emphasis has been placed on efforts to inhibit or arrest crack propagation. Recent theoretical evaluations indicate that increased resistance to thermal shock can be attained by inhibiting a propagating crack. Heretofore, the inhibition of crack propagation has been accomplished somewhat successfully by the addition of small amounts of certain metal powders to a ceramic oxide matrix.

With the utilization of this invention, however, it has been found that an even greater resistance to thermal shock can be achieved by the incorporation of boron nitride flakes as an inert, non-reactive phase which is dispersed uniformly throughout a refractory oxide matrix such as alumina, beryllia, magnesia or thoria. The combination of boron nitride and the refractory oxide forms a composite which eliminates the deficiencies of either the oxide or the nitride when considered individually as single phase materials.

SUMMARY OF THE INVENTION

In accordance with this invention, it has been found that the addition of boron nitride flakes to a refractory oxide matrix forms a composite material in which the propagation of cracks is inhibited with a resultant increase in resistance to failure from thermal fracture. The boron nitride is dispersed uniformly throughout the refractory oxide matrix utilizing conventional wet-mixing techniques. The composite is then fabricated from the blend, after thorough drying, using standard powder fabrication techniques of hot pressing.

Accordingly, the primary object of this invention is to provide a ceramic material that possesses a high degree of resistance to thermal shock and is particularly adapted for use as a structural material in the fabrication of antenna windows for advanced reentry vehicles.

Another object of this invention is to provide a refractory oxide composite in which the propagation of cracks has been inhibited in order to increase its resistance to failure from thermal fracture.

A further object of this invention is to provide a refractory oxide composite with boron nitride flakes present as an inert, non-reactive phase for the purpose of increasing the thermal shock resistance of the oxide composite.

The above and still further objects and advantages of this invention will become apparent upon consideration of the following detailed description thereof.

DESCRIPTION OF THE PREFERRED EMBODIMENT

In general, the ceramic composites of this invention are formed by incorporating flakes of boron nitride into a powdered refractory oxide matrix as an inert, non-reactive phase. The nitride is dispersed uniformly throughout the matrix using conventional wet-mixing techniques. After thorough drying, the dispersed blend is then subjected to standard powder fabrication techniques of hot pressing in order to form the compacted composites which can then be machined for further applications as a structural material.

Oxides of beryllium, magnesium, aluminum and thorium have been found to be especially valuable for use as the oxide component of the composite. Other oxides may also be used provided the oxide matrices are chemically compatible with the dispersed boron nitride phase. However, the invention is limited to composites containing from about 5 to 30 volume percent boron nitride which is incorporated into the matrix in flake form only since the incorporation of powdered boron nitride does not provide the necessary increase in thermal shock resistance that is achieved by using a dispersed phase having a flake morphology.

The boron nitride flakes are manufactured according to conventional techniques such as by shearing pyrolytic boron nitride in a rotary blender and in an organic medium. The flake size found to provide the optimum microstructure for the composites of this invention is a flake having a diameter of about 0.003 to 0.015 inches with a diameter to thickness ratio of about 10:1.

The dispersed boron nitride phase possesses a thermal expansion coefficient lower than that of the oxide matrix thus inhibiting and arresting the propagation of undesirable cracks. The desirable microscopic cracking, which occurs as a result of the nitride addition, takes place in the oxide matrix with the advantage that it is not restricted to any physical property of the composite itself.

With the foregoing discussion in mind, there are presented in Table I the following examples which illustrate to those skilled in the art the manner in which this invention is carried out. The examples disclose specific oxide composites fabricated in accordance with this invention.

TABLE I

| Example | Components in Volume Percent | | | | |
|---|---|---|---|---|---|
| | BN | Al$_2$O$_3$ | B$_e$O | MgO | ThO$_2$ |
| 1 | 5 | 95 | | | |
| 2 | 15 | 85 | | | |
| 3 | 30 | 70 | | | |
| 4 | 5 | | 95 | | |
| 5 | 15 | | 85 | | |
| 6 | 30 | | 70 | | |
| 7 | 5 | | | 95 | |
| 8 | 15 | | | 85 | |

TABLE I-continued

| Example | Components in Volume Percent | | | | |
|---|---|---|---|---|---|
| | BN | Al$_2$O$_3$ | B$_e$O | MgO | ThO$_2$ |
| 9 | 30 | | | 70 | |
| 10 | 5 | | | | 95 |
| 11 | 15 | | | | 85 |
| 12 | 30 | | | | 70 |

The composites illustrated by the examples of Table I are fabricated by first blending the two components using a standard wet mixing process and then forming the composite by hot-pressing the preblended materials according to conventional powder metallurgical techniques.

Subsequent thermal shock tests of the composites described in the examples were performed on a high pressure arc-jet under conditions that can be rated severe. A composite containing flakes of boron nitride in a berrylium oxide matrix were found to be superior to either boron nitride or slip-cast fused silica. Of three samples of boron nitride, two exploded with the surviving sample showing excessive surface cracking. Two slip-cast fused silica samples survived the heating cycle but surface cracks were apparent on both. The two beryllium oxide/boron nitride composites which were tested exhibited superior performance relative to the slip-cast fused silica.

As a further indication of merit, the average recession rate of each material can be given consideration. For the beryllium oxide/boron nitride composite, this rate was found to be 0.018 inches/sec. For boron nitride it was found to be 0.021 inches/sec and for slip-cast fused silica it was found to be 0.024 inches/sec. For potential use as antenna window materials, the beryllium oxide/boron nitride composite of this invention more closely matches the recession rates of heat shield materials of about 0.015 inches/sec.

The superiority of unalloyed refractory oxides especially beryllium oxide, in their resistance to thermal fracture is restricted to thermal conditions of mild or medium severity. The inferiority of this material under more severe environments is well known. However, when refractory oxides such as beryllium oxide are alloyed with flakes of boron nitride, in accordance with this invention, the superiority of the resulting refractory oxide composite becomes evident under conditions that are so severe that cracking takes place in all unalloyed specimen tested.

It should be understood by those skilled in the art to which the present invention pertains that while the specific composites described herein illustrate preferred embodiments of the invention, various modifications and alterations can be made without departing from the spirit and scope thereof and that all such modifications as fall within the scope of the appended claims are intended to be included herein.

What is claimed is:

1. A hot-pressed ceramic oxide composite possessing a high degree of resistance to failure from thermal fracture, said composite consisting essentially of a blend composed of about 5 to 30 percent by volume of boron nitride flakes uniformly dispersed in a powdered refractory oxide matrix.

2. A hot-pressed ceramic oxide composite in accordance with claim 1 wherein said refractory oxide is selected from the group of oxides consisting of aluminum, beryllium, magnesium and thorium.

3. A hot-pressed ceramic oxide composite possessing a high degree of resistance to failure from thermal fracture, said composite consisting essentially of a blend composed of about 5 to 30 percent by volume of flaked pyrolitic boron nitride having a flake size of about 0.003 to 0.015 inches in diameter with a diameter to thickness ratio of about 10:1 uniformly dispersed in a refractory oxide matrix of powdered beryllium oxide.

* * * * *